UNITED STATES PATENT OFFICE.

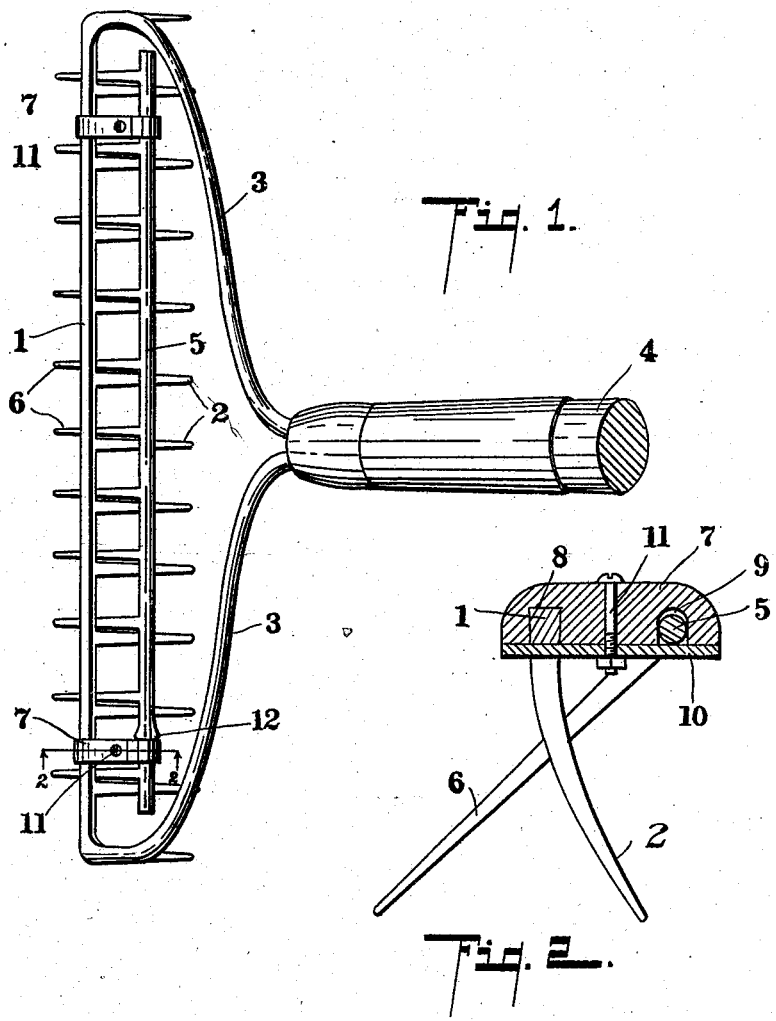

LOREN L. LOVELAND, OF PRAIRIEVILLE, MICHIGAN.

RAKE.

No. 915,978.      Specification of Letters Patent.      Patented March 23, 1909.

Application filed June 19, 1908. Serial No. 439,422.

*To all whom it may concern:*

Be it known that I, LOREN L. LOVELAND, a citizen of the United States, residing at Prairieville, Barry county, Michigan, have invented certain new and useful Improvements in Rakes, of which the following is a specification.

This invention relates to improvements in rakes.

My invention relates particularly to an improved attachment for rakes whereby an ordinary rake may be converted into a self-clearing rake.

The main object of this invention is to provide in a rake an improved attachment adapted to be applied to rakes as ordinarily constructed for converting such ordinary rakes into self-clearing rakes.

Further objects, and objects relating to structural details, will definitely appear from the detailed description to follow.

I accomplish the object of my invention by the devices and means described in the following specification.

The invention is clearly defined and pointed out in the claims.

A structure embodying the features of my invention is clearly illustrated in the accompanying drawing, forming a part of this specification, in which—

Figure 1 is a perspective view of a rake embodying the features of my invention, the handle being cut away. Fig. 2 is an enlarged detail section taken on a line corresponding to line 2—2 of Fig. 1, showing the means for securing the clearing rake to the main rake.

In the drawing, similar numerals of reference refer to similar parts throughout the several views.

Referring to the drawing, the main rake preferably consists of the head bar 1 with teeth 2, the bar and teeth in the structure illustrated being shown integral, it being the common form of garden rake.

The rake shank 3 is preferably yoke-like in form and is secured at the ends of the head bar. The rake is provided with the usual handle 4.

The clearing rake preferably consists of the head bar 5, having teeth 6 thereon. The head bar and teeth are also preferably formed integrally, as illustrated, the teeth being spaced to correspond to the spacing of the teeth 2 of the main rake head bar. The clearing rake is detachably secured to the main rake by means of the clamps consisting of the clamp members 7 having notches 8 therein adapted to receive the main rake head bar 1 and bearing slots 9 adapted to receive the clearing rake head bar 5. The plate-like clamping member 10 is secured on the under side of the member 7 by means of the bolts 11. This forms a simple and effective clamp, and one which effectively supports the clearing rake in front of and in a spaced relation to the main rake, so that the teeth of the clearing rake can swing between the teeth of the main rake. The clearing rake is preferably so arranged that its teeth swing close to the teeth of the main rake, thereby more effectively clearing them. These teeth are longer than the teeth of the main rake, so that, when the rake is in operation, they project to the rear thereof, as clearly appears in Fig. 2. The teeth of the main rake are preferably curved forwardly, as there illustrated. By thus forming the parts, the clearing rake can be readily attached to rakes of ordinary construction now on the market, and can be applied or removed, as may be desired; as, for example, if the rake is desired for use as a garden rake, a clearing rake is unnecessary and may be objectionable, while, if it is desired to use the same for a lawn rake, it is highly desirable to use the clearing attachment, so that, by making the clearing rake readily detachable I secure the advantage of both a garden and self-clearing lawn rake.

I have illustrated and described my improvements in detail in the form preferred by me on account of its structural simplicity and economy. I am, however, aware that the structure is capable of considerable variation in structural details without departing from my invention.

Having thus described my invention, what I claim as new and desire to secure by Letters Patent is:

1. In a rake, the combination with the main rake comprising a head bar and teeth, of a handle; a clearing rake comprising a head bar and teeth; and clamps for securing said clearing rake to said main rake, each of said clamps comprising a clamp member notched to receive the main rake head bar and to form a bearing for the clearing rake head bar, a plate-like clamp member adapted to engage the under sides of said head bars, and a bolt for securing said clamp members together whereby said clearing rake is pivotally supported in front of said main rake so that its teeth may swing between the teeth of the main rake.

2. In a rake, the combination with the main rake comprising a head bar and teeth therefor, of a clearing rake comprising a head bar and teeth; and clamps for securing said clearing rake to said main rake having bearings therein for said clearing rake head bar adapted to be clamped upon the said main rake head bar whereby said clearing rake is pivotally supported in front of said main rake so that its teeth may swing between the teeth of said main rake.

3. In a rake, the combination with a main rake comprising a head bar and teeth therefor, of a clearing rake comprising a head bar and teeth; a yoke-like shank for said main rake extending from the ends of said head bar thereof; and clamps for securing said clearing rake to said main rake head bar whereby said clearing rake is pivotally supported within the yoke-like shank so that its teeth may swing between the teeth of the main rake.

In witness whereof, I have hereunto set my hand and seal in the presence of two witnesses.

LOREN L. LOVELAND. [L. s.]

Witnesses:
    LUELLA G. GREENFIELD,
    GERTRUDE TALLMAN.